UNITED STATES PATENT OFFICE.

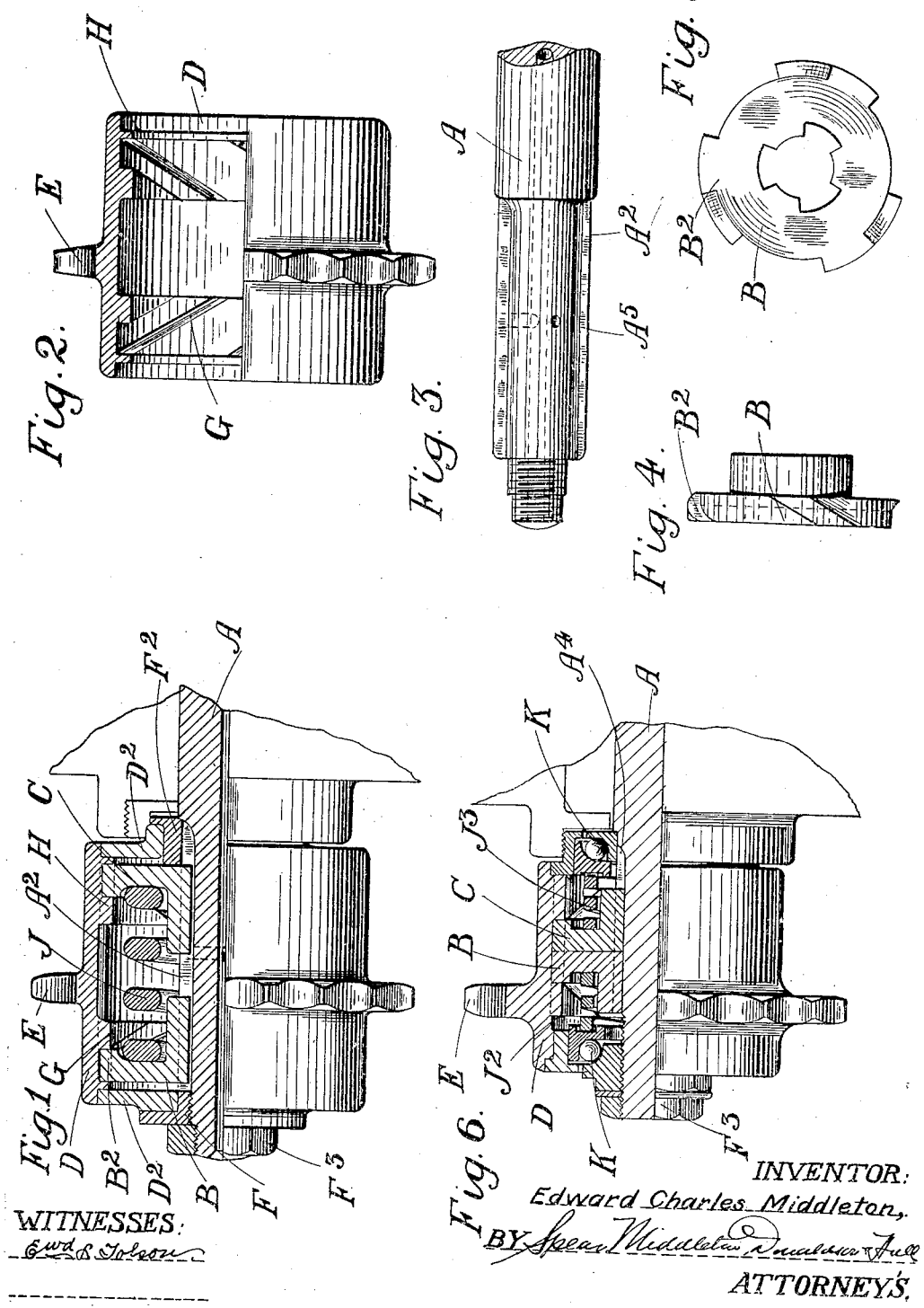

EDWARD CHARLES MIDDLETON, OF COVENTRY, ENGLAND, ASSIGNOR TO TRIUMPH CYCLE COMPANY, LIMITED, OF COVENTRY, ENGLAND.

TRANSMISSION SHOCK-ABSORBER.

1,349,082.  Specification of Letters Patent.  Patented Aug. 10, 1920.

Application filed March 17, 1920. Serial No. 366,462.

*To all whom it may concern:*

Be it known that I, EDWARD CHARLES MIDDLETON, a subject of the King of England, residing at Coventry, in the county of Warwick, England, have invented certain new and useful Improvements in Transmission Shock-Absorbers, of which the following is a specification.

This invention relates to transmission shock absorbers of the kind in which the torque is transmitted from a shaft to a sleeve, or vice versa, through a device which can slide on splines or the like on the one and on a thread or the like on the other against the action of a spring.

The object of this invention is to provide a construction of small dimensions in which the spring pressure will be self-contained and the pitch of the thread small.

According to this invention, a pair of screwed and splined coupling members is used, engaging threads of opposite senses and a single spring is located between them, or one spring is placed at the outer side of each. As the shock absorber operates, the coupling members move toward and away from one another and the spring, or springs, are compressed and elongated, the thrust being at all times contained within the bearings of the sleeve upon the shaft.

In the accompanying drawings,

Figure 1 is a half section, half elevation of a device in accordance with this invention having a single spring.

Fig. 2 is a similar view of the sleeve.

Fig. 3 is an elevation of the splined shaft.

Fig. 4 an elevation of a coupling member, and

Fig. 5 a face view of the same.

Fig. 6 is a similar view to Fig. 1 showing a construction with two springs.

Like letters indicate like parts throughout the drawings.

In the construction shown in Figs. 1–5 the crankshaft A of a motor cycle engine (or some other suitable shaft) is splined at $A^2$ to receive the hubs of a pair of disks B, C which slide on the splines $A^2$ and constitute the coupling members. The sleeve D is constituted by the hub of a chain sprocket E or the like, and has end flanges $D^2$ attached thereto which take a suitable bearing upon collars F, $F^2$ on the shaft A and serve to inclose the parts. The collar F is secured on the shaft by a nut $F^3$ or the like.

The interior of the sleeve D is provided at each end with a coarse thread G and H and the two threads are of opposite sense, and each coupling disk is formed with teeth, such as $B^2$ which engage one thread.

Between the coupling disks B and C is a strong spring J, which tends to push the disks apart. Or, as shown in Fig. 6, there may be a spring $J^2$ and $J^3$ at the outer side of each disk B and C abutting against a thrust bearing K carried either by the sleeve or the shaft, preferably bearing against shoulder $A^4$ on the latter. As torque fluctuates in passing from the shaft to the sleeve, the disks B and C move toward or away from one another, as the case may be, against the spring or springs, and shocks are absorbed in the well-known manner.

It will be clear that the spring pressure is self-contained, in the one case between the two coupling members, and in the other between the nut $F^3$ and the shoulder $A^4$, both on the shaft, and the thrust does not in either case extend beyond the bearings of the sleeve D on the shaft A. Preferably in the case shown in Fig. 1, one disk is normally at the end of its thread, when the device is at rest, and the other is at a small distance therefrom, so that a little latitude is left to allow for wear or errors in machining, etc.

The device may be fitted to an engine or gear box shaft, or by suitable modification, to a road wheel and the position of the splines and threads may be reversed. That is the splines may be inside the sleeve D and the threads on the shaft A.

The threads are preferably short inclines, corresponding to multiple start threads, as is clear in Fig. 2.

The shaft A may be hollow for the passage of lubricant into the sleeve, and provided with holes $A^5$ for this purpose.

What I claim as my invention and desire to secure by Letters Patent of the United States is:—

1. In a transmission shock absorber the combination of a shaft of non-circular cross-section, a sleeve surrounding said shaft, inclines at one end of said sleeve, inclines of the opposite sense at the other end of said sleeve, two coupling members each engaging one set of said inclines and adapted to slide on said shaft, bearings for said sleeve on said shaft, and spring pressure means engaging said coupling members and self-contained within said bearings, substantially as set forth.

2. In a transmission shock absorber the combination of a shaft of non-circular cross-section, a sleeve surrounding said shaft, inclines at one end of said sleeve, inclines of the opposite sense at the other end of said sleeve, two coupling members each engaging one set of said inclines and adapted to slide on said shaft, bearings for said sleeve on said shaft and a spring abutting against each bearing and against the adjacent coupling member, substantially as set forth.

3. In a transmission shock absorber the combination of a shaft of non-circular cross-section, a sleeve surrounding said shaft, inclines at one end of said sleeve, inclines of the opposite sense at the other end of said sleeve, two coupling members each engaging one set of said inclines and adapted to slide on said shaft, bearings for said sleeve on said shaft, a spring abutting against each bearing and against the adjacent coupling member, an oil passage in said shaft, and radial oil outlets therefrom into the interior of said sleeve, substantially as set forth.

In testimony whereof I have signed my name to this specification in the presence of two witnesses.

EDWARD CHARLES MIDDLETON.

Witnesses:
ALBERT G. FRANKLIN,
J. BACHELOR.